March 11, 1958     J. H. LEMELSON     2,826,110
HOLLOW SHEET METAL RIVET WITH REINFORCING WORK ENGAGING SHOULDERS
Filed Jan. 2, 1952
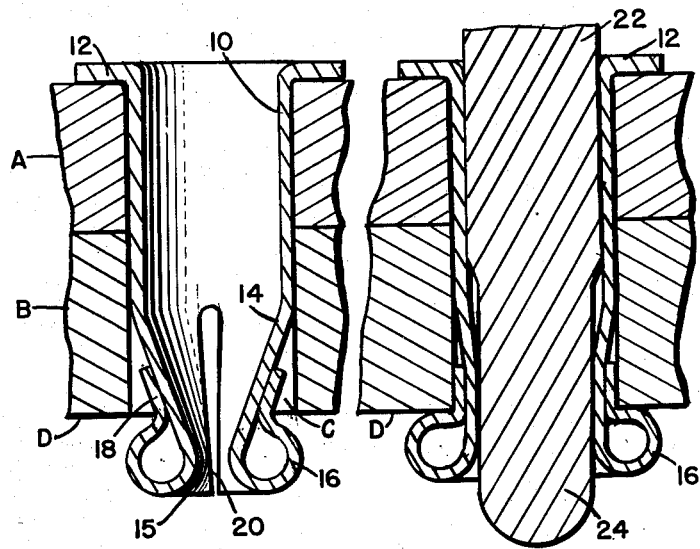
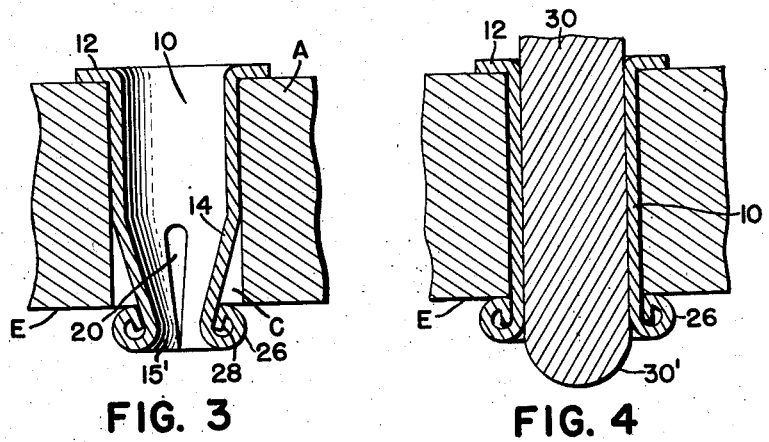
INVENTOR.
JEROME H. LEMELSON

United States Patent Office 2,826,110
Patented Mar. 11, 1958

2,826,110

HOLLOW SHEET METAL RIVET WITH REINFORCING WORK ENGAGING SHOULDERS

Jerome H. Lemelson, Staten Island, N. Y.

Application January 2, 1952, Serial No. 264,483

3 Claims. (Cl. 85—40)

This invention relates to fastening devices and in particular to tubular blind setting fasteners of the head and shank type.

It is a prime object of this invention to provide new and improved tubular fasteners which may be secured blind to a work member or members.

Another important object is to provide a tubular fastener which may be easily fabricated at low cost and which may be utilized to secure two or more members together.

Still another object is to provide light weight tubular fasteners which may be used to secure stand-off members and the like to work members.

The above objects as well as further features and advantages of the present invention will best be appreciated by reference to the following detailed description of the illustrated embodiments of Figs. 1 to 4 wherein:

Fig. 1 is a section thru a hole in two abutted sheets showing a tubular fastener inserted into said hole;

Fig. 2 is the same as Fig. 1 with a pin inserted into said tubular fastener;

Fig. 3 is a section thru a hole in a work member showing another embodiment of the fastener of Fig. 1;

Fig. 4 is the same as Fig. 3 with a standoff inserted into said tubular fastener.

The fastener shown in Figs. 1 and 2 is illustrated as functioning as a blind setting rivet for securing two work members or sheets A and B together. Said fastener comprises a tubular shank 10 having a head 12 formed at one end thereof. The other end 14 of said shank 10 is formed with a conical inward taper and has an end-formation comprising tubular looped bead like coil formation 16 formed of and circumscribing said shank-end, save in areas 20 where 14 is slotted. Two or more separations or slots 20 extend from the formed-end of the shank and devise the conical section 14 into two or more cantilevered spring arms 15. The numeral 18 refers to end formations of the coiled section 16 of arms 15 which extends adjacent to the exterior surface of the conical shank-end 14 as illustrated.

The letter C refers to a hole in the work member B which is aligned with a hole of similar diameter in the work member A. The length of the tubular shank 10 is such that the looped end-sections 16 project from the face of the member B while the head 12 engages the outer face of A as illustrated in Fig. 1 a degree whereby said formations 16 are capable of engaging the face D of work member B when the conical, tapered shank section 14 is expanded outward as in Fig. 2. Expansion of the shank-end 14 and the engagement of looped formation 16 against the work may be effected by the insertion of a pin, nail or other similar device 22 thru the interior of the fastener as illustrated in Fig. 2. The diameter of the pin 22 is essentially the inside diameter of the shank 10 to permit 22 to frictionally engage said shank so that said pin remains therein and will not work loose and fall out. When the shank-end 14 is expanded outward after 22 is inserted as shown, the end-sections 18 of the loops 16 become wedged between the walls of the hole C and the lower shank segments 15. This acts to improve the rigidity of the looped sections 18 so that they further resist deformation which may result from forces applied to pry parts A and B apart. The lower end 24 of pin 22 is shown having a diameter which is less than the upper section of said pin to accommodate and permit the wedging of the end sections 20 between the walls of C and 14. The pin 22, in addition to functioning as means for expanding the shank-end 14 may also be used as a stand-off element.

The tubular fastener illustrated in Figs. 3 and 4 is similar to that of Figs. 1 and 2 with the exception that the curled end of its shank 10 is conically shaped and inwardly tapered toward said end. The shank-end 14 is divided into multiple segments 15' by separation or slits 20 extending along part of the shank from said end. The end of the shank sections 15' are shaped with beaded formations 26 which are curled sections of said shank bent into at least a 180 degree loop. The numbers 28 refer to the ends of the curled sections 26 which abut the outer surface of the segments 15' and terminate against the inside of each curled section as illustrated.

Whereas in Fig. 3, the sheet metal fastener is shown as merely nesting in the work hole C, Fig. 4 shows the curled ends 26 of segments 15' engaging the blind face of the work member A as the result of forcing a pin 30 thru the conical end section 14 of said fastener. The diameter of pin 30 is equal or slightly less than the inside diameter of said tubular upper shank section 10. As the rounded end 30' of the pin 30 passes thru said conical section 14, the split sections 15' of the shank expand outward. If the length of the shank 10 is correctly chosen for the thickness of the panel member A, the coiled sections 26 will abut the face E of said panel. The pin 30 is frictionally engaged in said fastener and may be used as a standoff. When the shank end 14 is expanded with the curled sections 26 engaging the face E, the end sections 28 serve to resist collapsing deformation of the coils 26. If the fastener is used for securing two panels or sheets together, said sections 28 will enhance the strength of their respective coils as they will have to buckle before their respective coil sections 26 collapse when said fastener is subject to axial or tensile loading.

Modifications are intended within the scope and spirit of the present invention and in certain instances, certain features of the invention will be used without a corresponding use of other features.

What I claim is:

1. A fastening device formed from sheet metal of substantially uniform thickness comprising the combination of a substantially cylindrical shank having a through bore, said shank having a head of enlarged diameter, the lower wall portion of said shank being downwardly and inwardly inclined to form a conical restriction in said bore and having axially extending slots extending to the bottom edge thereof to permit outward expansion of said lower portion, said shank at the end of said inwardly inclined portion defining work engaging portions, each said work engaging portion being a curved bead-like member comprising a lower arm which is integral with said shank at the lower edge thereof and which extends outwardly therefrom, an outer leg extension of said lower arm which extends upwardly therefrom, an upper arm extension of said outer leg which extends inwardly therefrom, and an inner leg extension of said upper arm which extends axially and which lies against the exterior of said inclined wall portion of said shank, the diameter of said lower portion of said shank including said work engaging portions being at least approximately the same as the diameter of the upper portion of said shank to permit insertion of said shank in a through-and-through hole of appropriate length in the work with said head abutting the upper face of the work and with said work engaging portions positioned below the work, and a substantially cylindrical insert member for insertion into the bore of said shank from the top thereof, said insert member being adapted to expand said lower portion of said shank and thereby force said work engaging portions radially outwardly of the periphery of the upper portion of said shank into position to engage the lower face of the work and to resist removal of said fastener shank from said hole both by the frictional engagement of the expanded lower portion of said shank against the walls of said thru and thru hole and the resistance of said bead-like engaging portions to longitudinal deformation.

2. A fastening device in accordance with claim 1, said inner leg extension extending upwardly and being adapted to be wedged frictionally between said shank and the bore of the hole in said work when said insert member is inserted into the bore of said shank.

3. A fastening device in accordance with claim 1, said inner leg extension extending downwardly into abutment with said lower arm.

References Cited in the file of this patent

UNITED STATES PATENTS

| | | |
|---|---|---|
| 1,484,610 | Myers | Feb. 19, 1924 |
| 1,601,796 | Gordon | Oct. 5, 1926 |
| 2,208,779 | Tinnerman | July 23, 1940 |
| 2,246,888 | Messenger | June 24, 1941 |
| 2,340,423 | O'Shaughnessy et al. | Feb. 1, 1944 |
| 2,369,670 | Gookin | Feb. 20, 1945 |

FOREIGN PATENTS

| | | |
|---|---|---|
| 177,213 | Great Britain | Mar. 20, 1922 |